US012748825B2

(12) United States Patent
Pagani

(10) Patent No.: US 12,748,825 B2
(45) Date of Patent: Sep. 29, 2026

(54) BLOCKCHAIN-BASED SYSTEM AND METHOD FOR PUBLISHING AN OPERATING SYSTEM

(71) Applicant: nChain Licensing AG, Zug (CH)

(72) Inventor: Alessio Pagani, London (GB)

(73) Assignee: nChain Licensing AG, Zug (CH)

( * ) Notice: Subject to any disclaimer, the term of this patent is extended or adjusted under 35 U.S.C. 154(b) by 53 days.

(21) Appl. No.: 18/026,562

(22) PCT Filed: Aug. 23, 2021

(86) PCT No.: PCT/EP2021/073219
§ 371 (c)(1),
(2) Date: Mar. 15, 2023

(87) PCT Pub. No.: WO2022/058124
PCT Pub. Date: Mar. 24, 2022

(65) Prior Publication Data

US 2023/0342437 A1 Oct. 26, 2023

(30) Foreign Application Priority Data

Sep. 21, 2020 (GB) ..................................... 2014825

(51) Int. Cl.
*G06F 21/57* (2013.01)
*G06F 21/12* (2013.01)

(52) U.S. Cl.
CPC .............. *G06F 21/12* (2013.01); *G06F 21/57* (2013.01)

(58) Field of Classification Search
None
See application file for complete search history.

(56) References Cited

U.S. PATENT DOCUMENTS

| | | | | |
|---|---|---|---|---|
| 10,901,732 | B1 * | 1/2021 | Nelson | G06F 9/223 |
| 2017/0031676 | A1 * | 2/2017 | Cecchetti | H04L 9/50 |
| 2019/0057115 | A1 * | 2/2019 | Liu | H04L 63/10 |
| 2020/0014531 | A1 * | 1/2020 | Falco | H04L 63/0884 |
| 2020/0042305 | A1 * | 2/2020 | Su | G06F 9/44589 |

(Continued)

FOREIGN PATENT DOCUMENTS

EP 3404891 A1 11/2018

OTHER PUBLICATIONS

PCT/EP2021/073219 International Search Report and Written Opinion dated Jan. 24, 2022, 21 pages.

(Continued)

*Primary Examiner* — Nelson S. Giddins
(74) *Attorney, Agent, or Firm* — Galvani Smith PLLC; Rowan P. Smith

(57) ABSTRACT

A method comprising, by a client device: identifying one or more target transactions, recorded on a blockchain, that contain operating system software stored in a payload of the one or more target transactions, the operating system software comprising at least part of an operating system, at least including some executable code of the operating system; accessing the operating system software from the payload of the one or more target transactions as stored on the blockchain; and running, on the client device, the operating system software as accessed from the one or more target transactions, the running comprising executing the executable code of the operating system.

20 Claims, 7 Drawing Sheets

(56) References Cited

U.S. PATENT DOCUMENTS

| | | | | |
|---|---|---|---|---|
| 2020/0073657 | A1* | 3/2020 | Robison | G06F 21/57 |
| 2022/0358189 | A1* | 11/2022 | Doiron | G06F 21/602 |

OTHER PUBLICATIONS

GB2014825.0 Combined Search and Examination Report dated Feb. 2, 2021, 9 pages.
Jack Davies, Edge Cases: The Metanet Blog, Medium, Aug. 12, 2019, retrieved from https://medium.com/nchain/edge-cases-the-metanet-blog-41b608c8fe67.
Wikipedia contributors, "Light-weight Linux distribution," Wikipedia, The Free Encyclopedia, https://en.wikipedia.org/w/index.php?title=Light-weight_Linux_distribution, accessed Sep. 13, 2020.
Zigbee Alliance, https://zigbeealliance.org/solution/zigbee/, accessed Sep. 13, 2020.
U.S. Appl. No. 18/009,317, filed Dec. 8, 2022.
Akira S., et al., "GitHub Textbook for Web Designers," First Edition, Impress Corporation, Nov. 1, 2014, p. 22.
Yoshiharu I., et al., "Inter-organizational Sharing of Software Information Using Blockchain," Lecture Notes/Software Studies 44, Fundamentals of Software Engineering XXV, Nov. 30, 2018, pp. 69-74.
Office Action of Korean application No. 10-2023-7013369 dated Apr. 7, 2026, 15 pages.

* cited by examiner

BLOCKCHAIN-BASED SYSTEM AND METHOD FOR PUBLISHING AN OPERATING SYSTEM

CROSS REFERENCE TO RELATED APPLICATIONS

This application is the U.S. National Stage of International Application No. PCT/EP2021/073219 filed on Aug. 23, 2021, which claims the benefit of United Kingdom Patent Application No. 2014825.0, filed on Sep. 21, 2020, the contents of which are incorporated herein by reference in their entireties.

TECHNICAL FIELD

The present disclosure relates to use of a blockchain whereby data content including software can be stored in a payload of a transaction on the blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a pool of ordered and validated pending transactions waiting to be included in a new block of the blockchain. It should be noted that the blockchain may be pruned at some nodes, and the publication of blocks can be achieved through the publication of mere block headers.

The transactions in the blockchain may be used to for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

A blockchain network is already a type of overlay network overlaid on an underlying network such as the Internet. However, it also possible to overlay a further layer of overlay network on a blockchain. An example of this is known as the Metanet. Each node of the Metanet is a different transaction on a blockchain (note "node" is now being used in a different sense, not to refer to a node of the blockchain network but rather a node of the Metanet). Data content and Metanet metadata is stored in a payload of each such transaction, in an unspendable output of the transaction by means of an OP_RETURN. The data content is the actual user content which the Metanet is being used to store, e.g. text, images, video or audio content, etc.; whilst the metadata defines links between Metanet nodes. The links or edges between Metanet nodes do not necessarily correspond to spending edges at the blockchain layer. I.e. if the input of a given Metanet transaction points to an output of another, funding transaction at the blockchain layer, the parent of that same transaction or Metanet node at the Metanet layer is not necessarily the same transaction as the funding transaction. Instead the links or edges at the Metanet layer define links between the data content of the Metanet.

SUMMARY

The present disclosure provides a new technique that allows one to publish operating system software on the blockchain, either as a live distribution or for installation on a client device.

According to one aspect of the present disclosure, there is provided a method comprising, by a client device: identifying one or more target transactions, recorded on a blockchain, that contain operating system software stored in a payload of the one or more target transactions, the operating system software comprising at least part of an operating system, at least including some executable code of the operating system. The method further comprises: accessing the operating system software from the payload of the one or more target transactions as stored on the blockchain; and running, on the client device, the operating system software as accessed from the one or more target transactions, said running comprising executing the executable code of the operating system.

Some devices could benefit from standard, always-available operating systems, which may be stored on a blockchain and downloaded on request, either to be run live from the chain or installed on the device. Updates may also be published on chain. For example, this would be especially applicable for Internet-of-Things (IoT) devices which use small operating systems and have a limited amount of resources. IoT devices can be produced in thousands of copies and scattered around large areas. Therefore, they can benefit from decentralized blockchain solutions, as they can connect to any available blockchain node having access to genuine data immutably stored on-chain (they could also use SPV, Simplified Payment Verification, or similar methods to double-check with other nodes). For instance, IoT devices may download and execute live distributions of operating systems available on-chain, and in embodiments they could also be remotely controlled by their administrator (e.g. using the bitcoin network to send to the device specific commands or code to be executed).

In embodiments an overlay network tree structure such as the Metanet may be used to structure files of the operating system. In such embodiments, a client device can download or execute or directly boot from the blockchain any compatible operating system, and the only information required is the root of the Metanet tree used to store a specific OS. The same tree can be used to publish commands and code (e.g., smart contracts) to be executed by one or more devices.

An IoT device, for example, may be produced with an embedded tree root (e.g., stored in a ROM), this IoT device will be always linked to the same tree, it will always download the correct version of the operating system and the published updates and it will execute any code (e.g. a smart contract) that is published in that tree. As long as the private keys used to create and manage that tree are not compromised, the IoT device is secure and can execute any arbitrary code in an evidencable or even provable way and using the specified libraries and modules.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
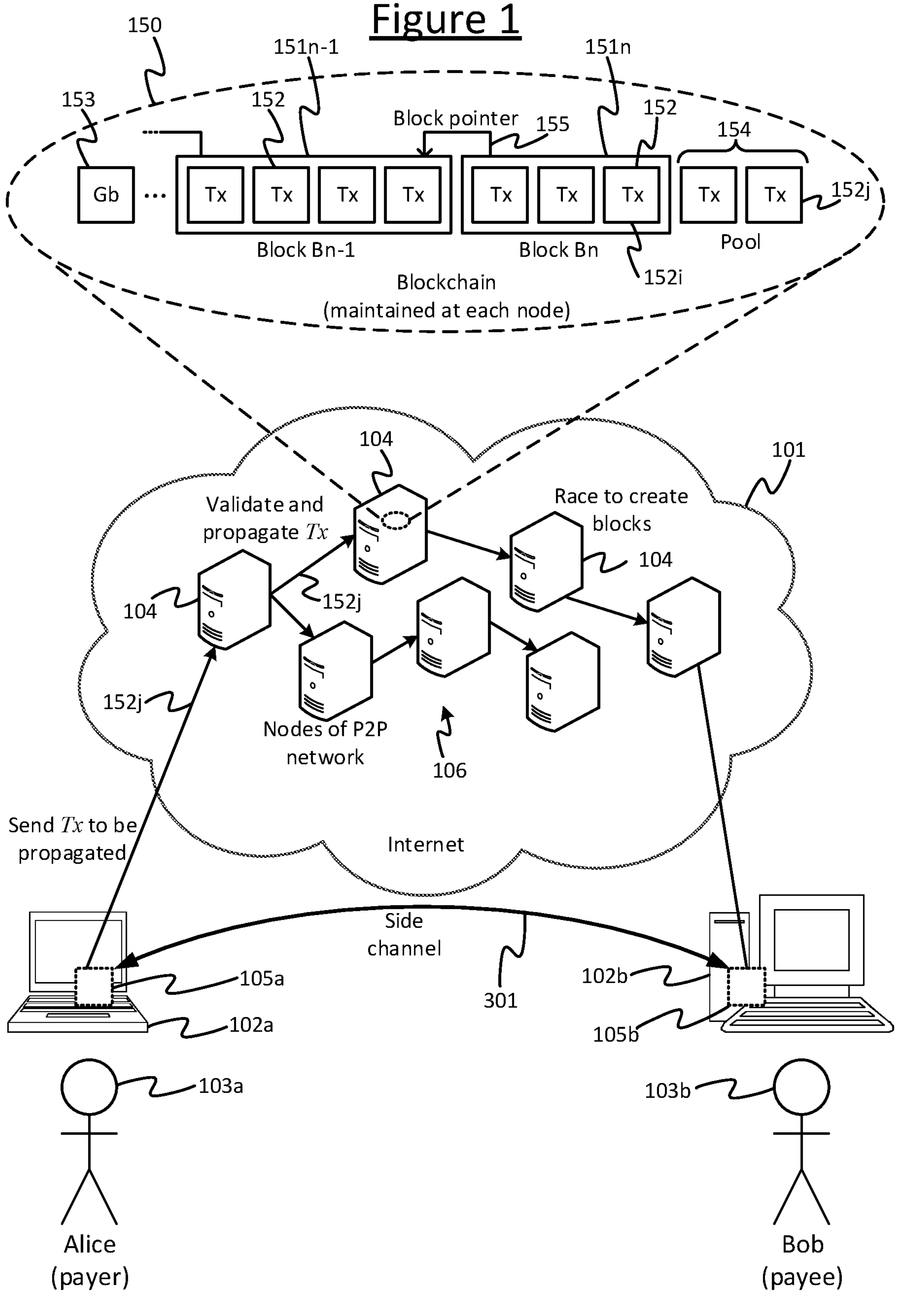
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered pool 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction **152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a*** in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction **152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104**.

In an output-based model, the definition of whether a given output (e.g. UTXO) is assigned (e.g. spent) is whether it has yet been validly redeemed by the input of another, onward transaction **152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150**. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block **151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106**, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block **151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150**. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block **151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n*** in which that transaction was published. This fee is normally referred to as the "mining fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users, each of which may be an individual user or an organization. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
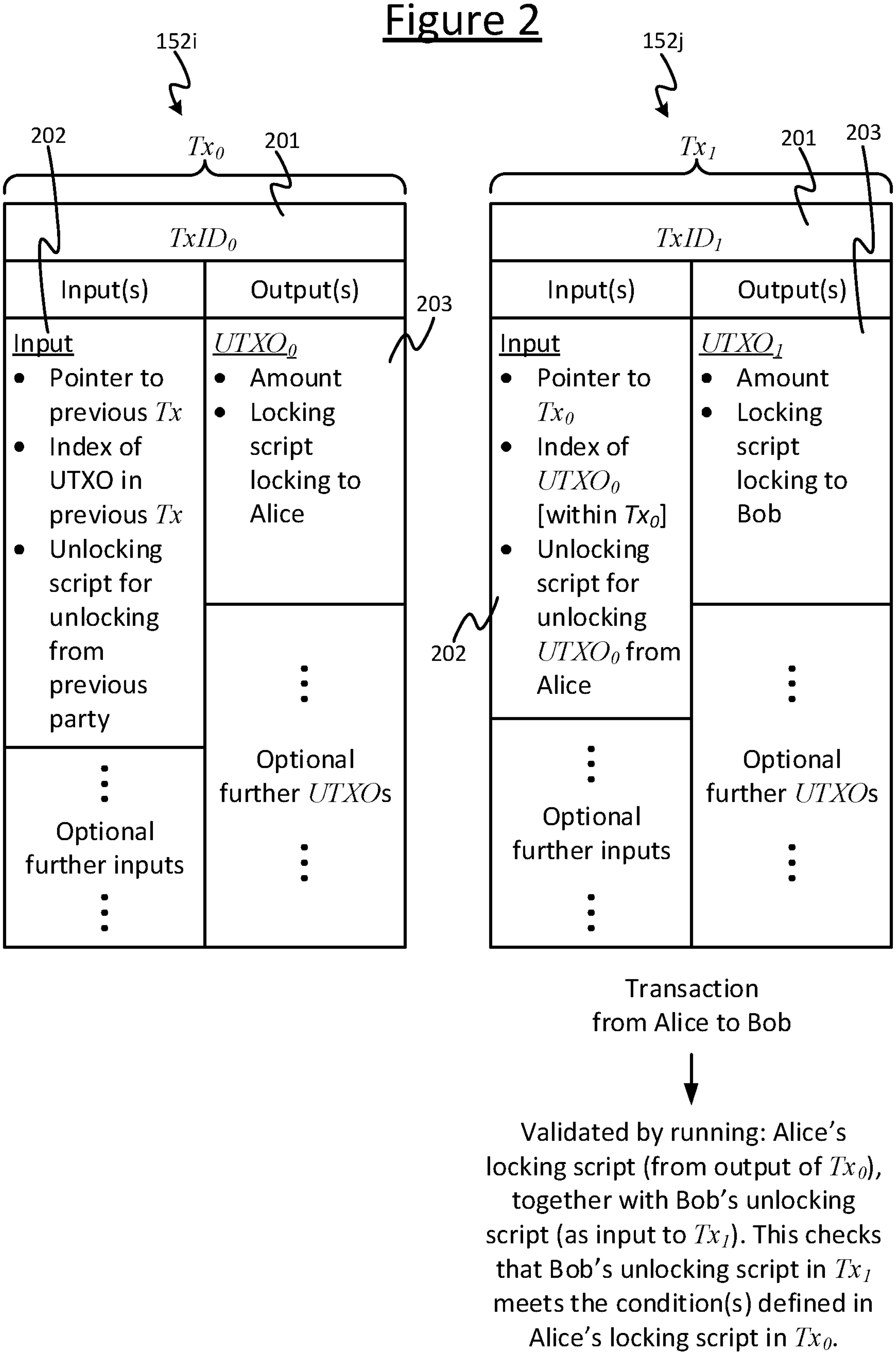
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<\text{Sig } P_A><P_A>\|[\text{Checksig } P_A]$$

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Layer-2 Overlay Network

A blockchain network 106 is already a form of overlay network overlaid on a network such as the Internet 101. However, it is also possible to layer another layer of overlay network on top of a blockchain. This is illustrated by way of example in FIG. 3. An example is the Metanet. Such a network could also be referred to as a "layer-2" network, in the sense that it is a second layer of overlay network relative to a base network 101 (e.g. Internet) as the underlying network infrastructure and the blockchain network 106 as the first layer of overlay network overlaid on the base network.

This second tier of overlay network 300 comprises a network of nodes 301 and edges 302. Note that a node 301 now refers to a node at the layer of the Metanet (or other such network overlaid on the blockchain), not a node 104 at the layer of the blockchain network 106 as discussed previously in relation to FIGS. 1 and 2. Each node 301 of the Metanet network (or the like) is a different respective transaction 152 on the blockchain 150, each of which stores data in a payload of the respective transaction. Hence a node 301 of the Metanet network 300 (or the like) may also be referred to herein as a data-storage node or data-storage transaction. The data stored therein may comprise data content and/or metadata, typically both. In an output-based model it may be stored in an unspendable output 203 of the respective transaction. The output may be made unspendable by means of one or more opcodes in the locking script that terminate the script when run. E.g. in a system that employs the Script language, this may be the OP_RETURN opcode, or OP_FALSE followed by OP_RETURN, depending on the protocol being used. However this is not limiting and the person skilled in the art will be aware of other techniques for storing any arbitrary payload data in a transaction in other blockchain systems, e.g. in a system employing an account-based model. The following may be exemplified in terms of an output-based model, but this is not limiting.

Note that the layer-2 overlay network 300 may consist purely of data, being entirely virtual. I.e. the nodes 301 and edges 302 of the Metanet or such like, as an overlay network overlaid on the transactions 152 of the blockchain 150, do not necessarily correspond to any particular physical actors or entities of the underlying blockchain network 106 or underlying network infrastructure 101.

The data content is the actual data the Metanet (or the like) is being used to store, e.g. text, audio, still or moving images, or other documents. It may also be referred to as user content or user data. The metadata implements the protocol for layering the network on top of the blockchain 150. In at least some of the transactions 152 it defines links between the data content. These may also be described as edges 302 between the nodes 301. The link or pointer may for example comprise the transaction ID, $TxID_{parent}$, of the parent node. Note that a "link" as referred to herein does not necessarily imply a hypertext link, though that is one possibility. More generally a link could refer to any form of pointer pointing to another node 301 to which the current node 301 is related at the Metatnet layer (or other such overlay layer layered on top of the blockchain 150).

For convenience the following will be described by way of example in terms of the Metanet, but it will be appreciated that this is not limiting and more generally, anywhere herein where reference is made to the Metanet, this may be replaced with any overlay network overlaid on a blockchain. Similarly any reference to a Metanet node may be replaced with reference to any overlay network node, or data-storage node of the overlay network, and any reference to a Metanet link or edge may be replaced with reference to any overlay network edge or link at the layer of the overlay network in question.

The Metanet protocol defines a scheme and standard for structuring on-chain data that can be stored on a public blockchain and used in various applications for many use cases. The protocol specifies that graph structures, comprising nodes and edges, can be constructed from sets of blockchain transactions, and that these structures may be used to store, convey, represent and distribute data ('content') of any nature. By treating transactions as nodes, and signatures as edges created between transactions, the Metanet protocol allows for the creation of on-chain graph structures as shown in FIG. 3.

As can be seen, the nodes 301 and edges 302 of the Metanet 300 form a tree structure. I.e. a parent node 301 is linked to one or more child nodes 301, and any given child 301 may itself be a parent linked to one or more children of its own, and so forth. Note that the tree structure in question for the present purposes may only be a subset of a wider tree or graph.

Figure 3:
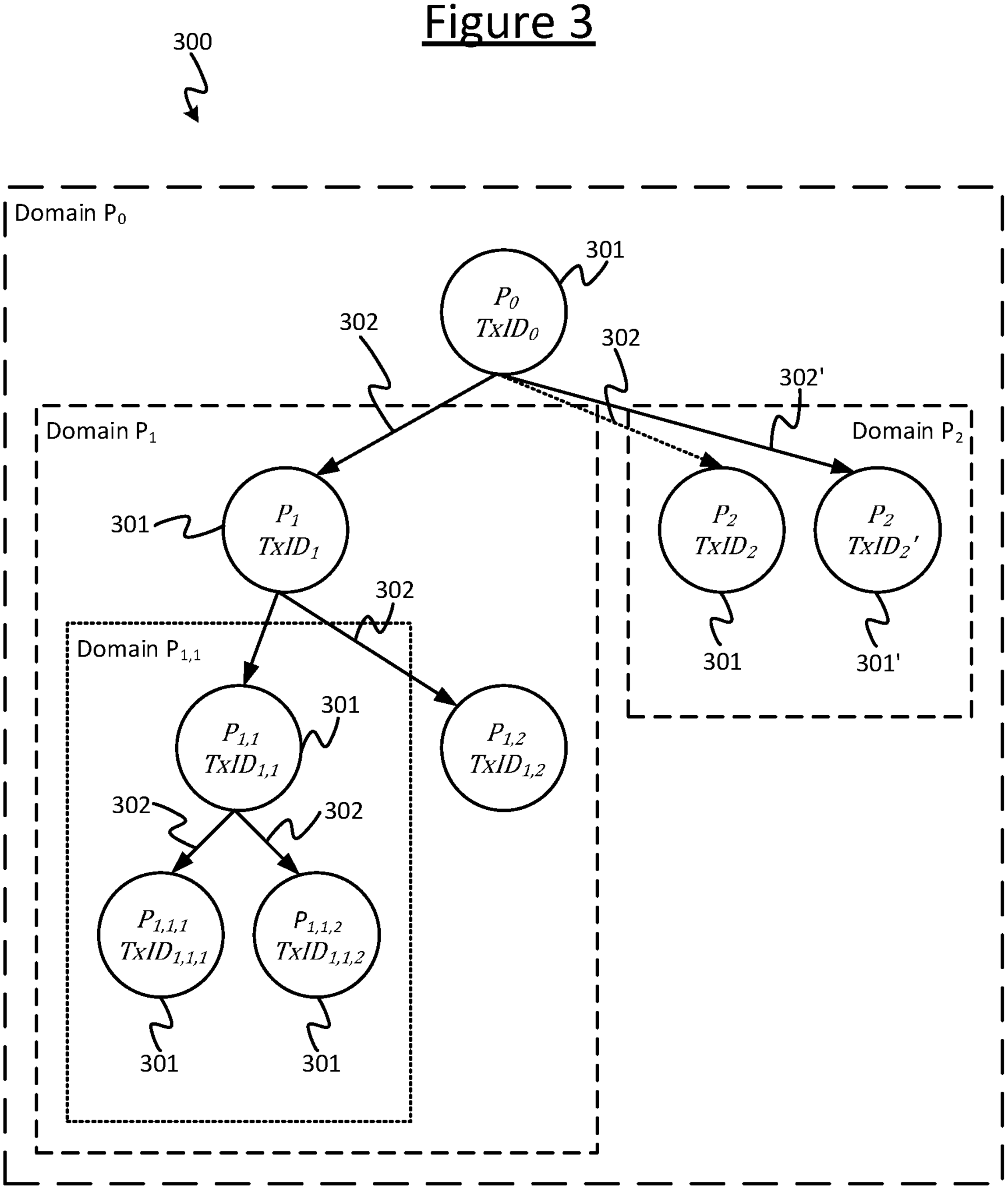
FIG. 3 is a schematic illustration of a network overlaid on a blockchain.

FIG. 3 also illustrates how a node 301 and its associated edge 302 may be updated. Since transactions are recorded immutably on the blockchain 152, an update to a Metanet node 301 requires creating a new instance 301' and corresponding edge 302' by means of a new transaction 152.

The structure of FIG. 3 may comprise nested domains, e.g. the structure of a website and its pages, where a 'top level domain' encapsulates the sub domains below it, and so on. One functional key domain (to be discussed later, e.g. the domain of the writing keys, funding keys or encryption keys) can span many of these structure domains.

The circles in FIG. 3 represent nodes, which are simply transactions that are created according to the rule set of Metanet protocol. An example of a transaction 152N that is created and formatted according that rule set is shown in FIG. 4.

Figure 4:
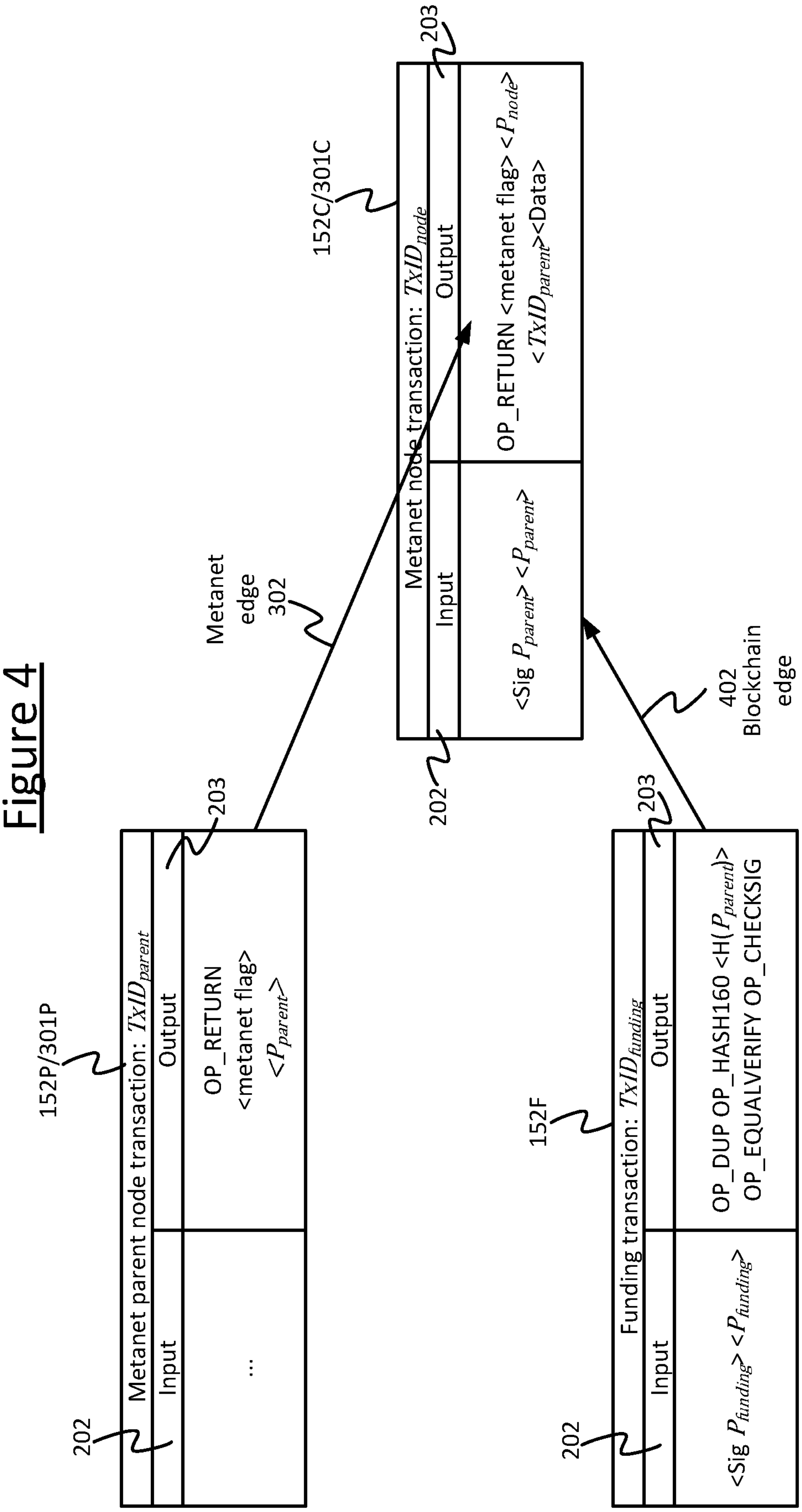
FIG. 4 is a schematic transaction diagram illustrating an example protocol for overlaying a network such as the Metanet on a blockchain.

The transaction 152C on the right-hand side of FIG. 4 represents a transaction 152 of the blockchain 150 implementing a given node 301C (a child) of the Metanet. The transaction 152P in the top-left of FIG. 4 represents a transaction of the blockchain 150 which implements a parent of the child node 152C at the Metanet layer. The child node transaction 152C has an input 202 which comprises an unlocking script, and which points to the output 203 of a funding transaction 152F of the blockchain 150. In other words the output of the funding transaction 152F is consumed by the input of the Metanet node 152C. Note that the funding transaction 152F and the Metanet parent transaction 152P are not necessarily the same transaction (though that is not excluded either).

The child transaction 152C includes an unspendable output 203, e.g. made unspendable by an OP_RETURN, which holds a payload (a payload from the perspective of the blockchain layer). This payload may comprise data content ("Data") of the Metanet, which be hashed and/or encrypted, or may be simply be the raw data ("in the clear").

The payload of the child transaction 152C also comprises metadata of the Metanet network layer. This metadata comprises at least the transaction identifier of the parent transaction 152P. This creates a link (edge) 302 at the Metanet layer. It may also be required by the Metanet protocol to include a key $P_{node}$ associated with the child node 301C.

The locking script of the output 203 of the funding transaction 152F also requires a signature to be included in the unlocking script in the input 202 of the child node 152C. Specifically, this signature is required to be a signature signed using a key $P_{parent}$ associated with the Metanet parent (i.e. a message signed by that key). This creates an edge 402 (sometimes called a spending edge) at the blockchain layer. If the required signature is not included in the unlocking script in the input 202 of the child transaction 152C, then the child transaction 152C will not be validated by the nodes 104 of the blockchain network 106, and hence will not be propagated through the blockchain network 106 nor recorded on the blockchain 150. Note again however that the funding transaction 152F is not necessarily the same blockchain transaction 152 as the Metanet parent transaction 152P, and hence the blockchain layer spending edge 402 is not necessarily the same as the Metanet layer edge 302.

FIG. 4 outlines only certain relevant components of a Metanet transaction as an abstraction of the transaction in its entirety. These components, in addition to a protocol identifier flag, include:

A public key $P_{node}$;

A signature $SigP_{Parent}$ of a parent public key $P_{Parent}$;

The transaction ID $TxID_{node}$ of the node itself; and

The transaction ID $TxID_{parent}$ of the parent of the node.

The placeholder <Data> refers generally to any content data that may be included in the Metanet node transaction. It is also possible in some applications that one would want to encrypt the data with an encryption key ek, in which case the data included in the transaction is cast as <e(Data, ek)>, where e( ) is a suitable encryption function.

Each Metanet node 301 can be uniquely identified by the pair ($P_{node}$, $TxID_{node}$), which is an index that allows for powerful versioning and permissioning control to be inherited by Metanet graphs. It should also be appreciated that each Metanet node contains enough information to identify itself ($P_{node}$, $TxID_{node}$) and its parent ($P_{parent}$, $TxID_{parent}$).

In order to ensure that a Metanet child node 301C transaction contains the correct input signature $SigP_{Parent}$ from a parent node 301P, it may be desirable in many cases to create one or more funding transactions 152F to facilitate this, which is shown in the bottom-left of FIG. 4.

The parent key $P_{parent}$ and/or child node key $P_{node}$ can be seen as a writing key that authorises writing the data of the child node 301C to the blockchain 150.

The Metanet thus provides a protocol that allows for on-chain data to be structured in such a way that encodes the permissioning and write-access controls for such data using only the underlying technology of the blockchain itself. The Metanet protocol is therefore a solution that allows users to provably own their on-chain content.

The Metanet protocol defines a set of rules that allows creation of a Metanet Direct Acyclic Graph (Metanet DAG). A single instance of a Metanet DAG is called a Metanet tree. Each Metanet tree has a root node (the top-level node), each Metanet node, including the root node, can have one or more child nodes (e.g. see again FIG. 3).

As such, the Metanet DAG becomes the global collection of trees, where each tree starts from its own root node and can have its own localised permissioning structure.

A Metanet node 301 is simply a transaction that follows the rule set of the Metanet protocol. There are two types of nodes: root nodes, which have no parent; and child nodes, wherein a given child node has exactly one parent. According to one implementation, the most basic outline structure of a Metanet node requires a transaction to meet the following criteria:

- The transaction has at least one OP_RETURN output.
- The OP_RETURN payload includes:
  - the Metanet flag.
  - a node address $P_{node}$.
  - a parent transaction ID $TxID_{parent}$.
- Each transaction, except the root nodes, contains an input signed by a parent node.

As mentioned, a Metanet node is a transaction 152 comprising four elements:

$P_{node}$—the address of the node.

$TxID_{node}$—the version of a node.

$P_{parent}$—the address of the parent of the node.

$TxID_{parent}$—the version of the parent of the node.

Metanet edges 302 are created by signatures. In order to create an edge from a parent node to a child node, the child node must be signed using the key pair associated with its parent, $SigP_{parent}$ must appear in the input of the child node.

Blockchain-Based Operating System

An operating system (OS) is defined as a software that schedules pieces of software (e.g. programs, tasks or threads) to run on a computer and coordinates their access to the hardware resources of the computer. For example the operating system provides access to processor time, memory allocation, and inputs and outputs of the computer (e.g. ports or peripheral devices). Generally, OSs are installed by users or system administrators and updated by the producers using proprietary centralized servers. Moreover, system administrators manage the OSs and other computer programs, installing updates and bugfixes and verifying their integrity.

While this solution is an optimal choice for big servers and ad-hoc complex machines, it can be inefficient for smaller devices and systems which use standardized software, for example. These devices could benefit from standard, small size, always available and updated operating systems, which may be stored on a blockchain and downloaded on request. This is especially applicable for IoT devices which use small operating systems and have a limited amount of resources. IoT devices can be produced in thousands of copies and scattered around large areas. Therefore, they can benefit from decentralized blockchain solutions, as they can connect to any available blockchain node having access to genuine data immutably stored on-chain (they could also use SPV or similar methods to double-check with other nodes). IoT devices may download and execute live distributions of operating systems available on-chain and they could be remotely controlled by their administrator (e.g. using the bitcoin network to send to the device specific commands or code to be executed).

The present disclosure provides a new technique that allows part or all of an operating system to be published on-chain, and to be accessed therefore to be executed on any (compatible) device. Embodiments may use an overlay tree structure such as the Metanet to structure the files of the operating system. In further embodiments, any device can download and execute any (compatible) operating system, with the only information required being the root of the Metanet tree used to store a specific OS. The same tree can be used to publish commands and code (e.g., smart contracts) to be executed by one or more devices.

The operating system (OS), the drivers and any required files and programs can be stored on-chain, or stored on a third-party server and hashed committed on-chain. Metanet-based OSs could be used in applications where a verifiable version of an OS is required, and/or applications where a suite of programs must be provably installed. In addition, they may be used to improve the software update and bug-fixing process.

More generally, operating system (OS) software could be stored in the payload of any one or more blockchain transactions on a blockchain 150, whether or not arranged in an overlay tree structure. The operating system software may be accessed from the blockchain 150 by any one or more client devices 102 that are clients of the blockchain, in order to be run on the client device(s) 102. The on-chain operating system software could comprise the whole operating system required by a client device 102, or could be only a part used to supplement existing operating software already installed on the client device 102.

Each of the client devices 102 in question may be any computer device, such as a desktop computer, laptop, tablet, smartphone or a wearable device such as a smartwatch or pair of smart-glasses. In embodiments, the client device or devices 102 accessing the on-chain OS software may comprise one or more Internet-of-Things (IoT) devices, e.g. a dedicated sensor device. Such an IoT device may have no screen and/or no keyboard or keypad included in its own housing. In embodiments the IoT device 102 may have no user input and/or output means integrated into its own housing at all.

Preferably the operating system software is stored in an overlay-network tree structure overlaid on the blockchain 150. In embodiments this may be a Metanet tree configured in accordance with the Metanet protocol.

Figure 5:
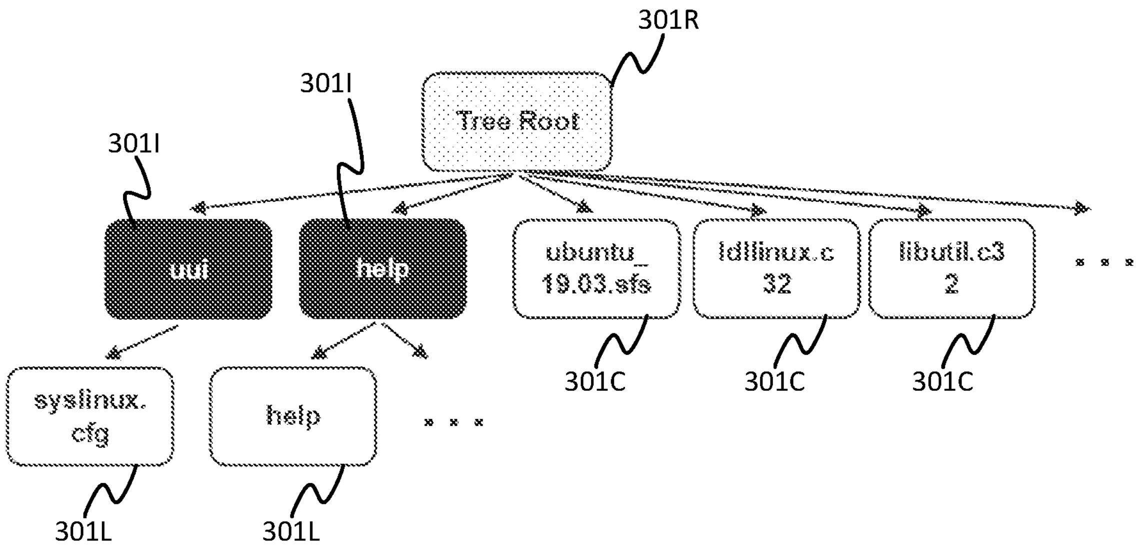
FIG. 5 schematically illustrates an operating system being stored in an overlay tree structure (in the example illustrated, a live Linux distribution of Puppy Linux BionicPup32 stored in a Metanet tree)

An example is shown in FIG. 5. As shown, a tree structure is created comprising a root node 301R and a plurality of leaf nodes 301L. The tree structure may be created for example by computer equipment of a producer of the operating system as a central resource for use by the respective computer equipment (client devices) 102 of one or more users 103.

The root node 301R is a parent node 301P of at least one child node 301C. Each node other than the root 301R is at least a child node 301C, and may also be a parent node 301P of another child 301C. A node that is both a child node 301C and a parent node 301P of another child may be referred to herein as an intermediate node 3011 of the tree.

Each node 3011, 301L other than the root 301R (i.e. each child node 301C) is connected by one edge 302 to a respective parent node 301P, which could be the root node 301R or an intermediate parent node 3011 which is itself a child of another parent. I.e. there could be two or more levels to the tree. Each leaf node 301L is a child node 301C only. In some cases, the root node 301R may be the parent node 301P of one or more of the leaf nodes 301L. And/or, in the case of more than one level to the tree, an intermediate level node 3011 is the parent 301P of one or more leaf node 301L, and the parent of each intermediate level node 3011 may itself be another, higher-level intermediate node 3011 or the root node 301R, depending on the number of levels in the tree.

Each node 301 is a different transaction 152 of the blockchain 150, for example as discussed in relation to FIGS. 3 and 4. Each edge 302 is a link between a pair of nodes 301. An edge 302 is created by cryptographically signing the child node with a private key associated with the respective parent node, which can be authenticated using the corresponding public key of the parent. In embodiments these edges 302 are created as discussed in relation to FIGS. 3 and 4. That is, each node 152 is a transaction of an output-based model (e.g. UTXO-based model) comprising at least one input 202 and at least one output 203, and the edge 302 is created by signing an input 202 of the child node 301C with the private key of the parent node 301P. To record the child 301C on chain, the input of the child 301C points to an output 203 of a funding transaction 152F whose locking script requires the signature of the parent to unlock and therefore to have the child node transaction 301C/152C validated by the blockchain network 106 for recordal on the blockchain. The parent node's key may be associated with the respective parent node 301P by being included in a payload in an output 203 of the parent node 301P. Also the transaction ID of the parent 301P may be included in a payload in an output of the child 301C. Refer again by way of example to FIG. 4. The payloads may be included in unspendable outputs of the respective transactions, e.g. made unspendable by an OP_RETURN or OP_FALSE and OP_RETURN, depending on the protocol being used. In embodiments the overlay protocol may be the Metanet protocol and thus the tree structure may take the form of a Metanet graph or part thereof.

However, in other overlay protocols it is not excluded that other methods could be used to create overlay edges 302 between transactions 152 and thus form a tree structure in which those transactions form nodes of the tree. Also, the tree structure could be formed using other types of transaction model, such as by means of smart contracts in an account-based model. The techniques disclosed below or elsewhere herein are not limited to an output-based transaction model unless explicitly stated.

In accordance with embodiments disclosed herein, operating system software comprising at least part of an operating system may be stored in one or more child nodes 301C of an overlay tree structure such as that shown in FIG. 5. In embodiments it is stored in one or more leaf nodes 301L. The part in question comprises at least some executable code of the operating system. It may also comprise other elements, e.g. one or more data files such as a config file. In embodiments the whole OS is stored on chain.

The transactions of the one or more child nodes 301C (e.g. leaf nodes 301L) which store the OS (or in embodiments commands—see later) may be referred to herein as target transactions, being targets for accessing the operating system software (or commands) stored therein. The OS software may be stored in a payload of the target transaction(s), in some cases spread over the payloads of multiple target transactions. In an output-based (e.g. UTXO-based) transaction model, the respective payload of each target transaction may be contained in one or more respective outputs 203 (e.g. UTXOs) of the respective target transaction. These may be one or more unspendable outputs, e.g. made unspendable by an OP_RETURN opcode or an OP_FALSE and an OP_RETUTN, depending on protocol used. The operating system software may be stored in the same output 203 as that used to record the ID of the parent node (see FIG. 4) or a different output 203. In other variants, the payload could be included in a smart-contract of an account-based model, for example.

Figure 9:
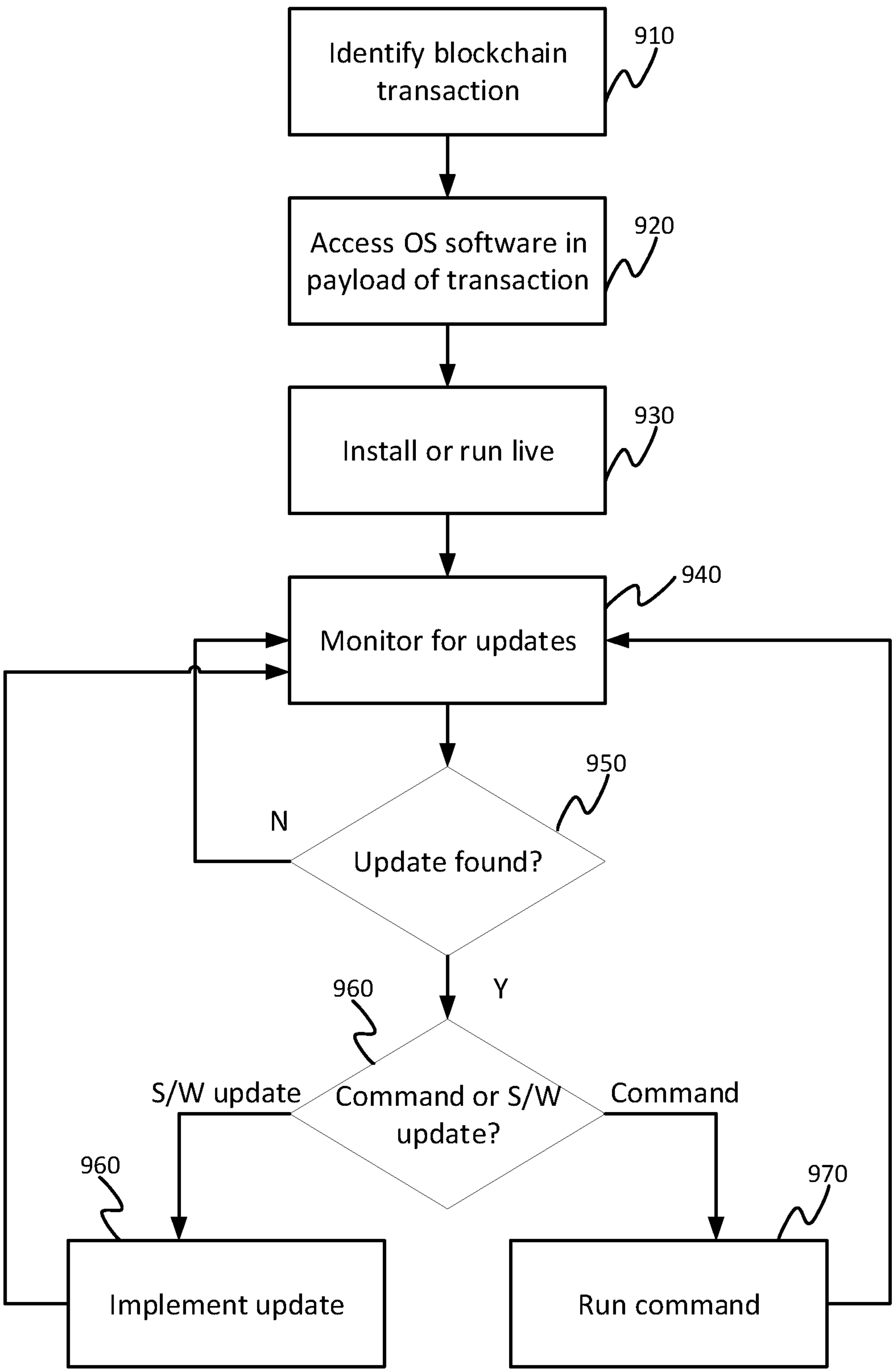
FIG. 9 is a schematic flow chart of an example method performed by a client device in accordance with embodiments disclosed herein.

FIG. 9 shows a method by which a client device 102, such as an IoT device, can access and run operating system software from the blockchain 150. The method may be performed by client software or firmware executed on the client device 102, or even by dedicated hardware of the device. In embodiments the method may be performed by a boot stub (an initial piece of boot code) executed from ROM of the client device 102 upon booting.

At step 901, the client device 102 identifies one or more target transactions, recorded on a blockchain 150, that contain operating system software stored in their payload. In embodiments, this step may be based on the transaction ID of the root node 301R (the "root ID" for short). In this case, the client device 102 starts from the root node based on knowing the root ID of the tree, and then follows paths formed from the edges 302, going down the tree from the root node 301R to find leaf nodes 301L, where the OS software is stored. For instance the root ID may be pre-stored in the client device 102, e.g. at manufacture or deployment. Thus all the client device 102 needs is the root ID and a connection to the chain 150, and it can find all the current OS software in the leaves 301L of the tree.

At step 920, the client device 102 accesses the operating system software from the payload of the one or more identified target transactions as stored on the blockchain 150. This comprises downloading the software, either permanently or temporarily (i.e. streamed), to the client device 102. It is downloaded from one or more of the nodes 104 of the blockchain network 106 which store(s) a copy of at least the part of the blockchain 150 which comprises the target transaction(s) in question.

At step 930, the client device 102 runs the operating system software that it has accessed from the target transaction(s) of the blockchain 150. This may comprise running the whole OS from the blockchain, or running a part of the OS from the blockchain 150 in conjunction with a complementary part already stored locally on the client device 102. Either way, the OS software that is accessed from the chain 150 may either be run live, or installed on the client device 102. In the former case the downloading comprises streaming the OS software from the blockchain 150 to RAM (random access memory), i.e. volatile memory, of the client device 102, where it is held temporarily. The software is run from the RAM in a streamed fashion. In the case of installation on the other hand, the OS software is downloaded to non-volatile storage of the client device 102. The installation also comprises configuring one or more files of the operating system to one or more specific properties of the hardware of the particular client device 102 on which the OS is being installed (installed software cannot necessarily be simply copied across to another device since it is configured for the particular device in which it is installed). The client device 102 then runs the installed version of the OS. After step 960 or 970 the method may loop back to step 940 to continue to monitor for further updates.

In embodiments the operating system software stored on-chain may be arranged into a file-and-folder structure, i.e. the software comprises a plurality of files, each of which is represented as being stored in a certain folder. Different files may be stored in different folders. The folders may comprise a hierarchal arrangement of parent folders and sub-folders (children of parent folders). Files may be stored in parent or sub-folders. In such embodiments, the tree structure of the overlay network, or at least part thereof, may be arranged to mirror part or all of the hierarchical file-and-folder structure of the operating system. This is convenient since the operating system naturally has a hierarchical structure to the organization of its files and the tree structure of the overlay network (e.g. Metanet) can be used to reflect this.

Figure 6:
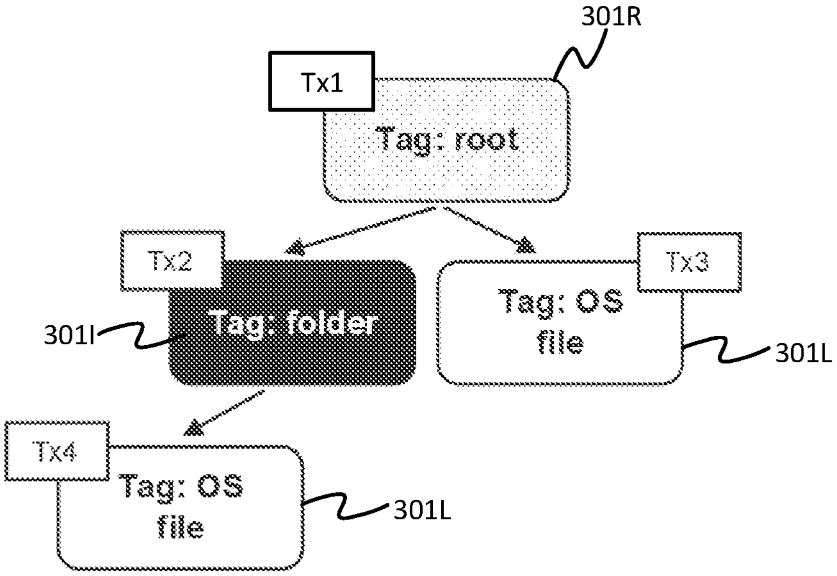
FIG. 6 schematically illustrates an example of an overlay network tree structure, such as a Metanet tree, being used to structure an OS.

An example is illustrated in FIG. 5, and another example in FIG. 6. In such embodiments, each node 301 may be tagged with a tag (e.g. in its payload) to indicate whether it is a folder node or a file node. A different tag may also be used to indicate the root 301R, though this is not essential as the root may be known to be the root by its ID. One of the leaf nodes 301L may be a child of the root node 301R (where child means an immediate descendent). This may be used to represent the file as being in the root directory of the file-and-folder structure. Another child of the root 301R may be tagged as a folder node. This is an intermediate node 3011 as it will have one or more children of its own, which could represent files or subfolders or a combination thereof. In the example shown in FIG. 6, the folder node has one child which is a leaf 301L, and used to hold a file. Of course more complex file-and-folder structures are possible.

In further, alternative or additional features embodied in accordance with the present disclosure, the client device 102 may be configured so as, as it walks the tree in step 910 to find the leaf nodes, to check the validity of each node 301 it encounters along each path. The validity here means at least the validity according to an overlay network protocol of the tree structure, e.g. the Metanet protocol. This protocol may comprise one or more protocol rules.

For instance, in embodiments the rules include the requirement that each child node 301C is signed by key of the respective parent node 301P, as discussed in relation to FIGS. 3 and 4. If any node 301 is found by the client 102 not to meet this requirement, then it and any of its children will be disregarded as invalid. This means that any OS software stored in that node or a child of that node will not be included in the OS software run by the client device 102.

In some embodiments, another rule is that only leaf nodes 301L are deemed to validly contain OS software (or commands) for the client device 102. In this case, the client device 102 will only run OS software that is found at the end of a path in a leaf node 301L. One advantage of this is that it provides a mechanism for deleting or updating pieces of the OS software, as will be discussed in more detail shortly.

As an optional addition to the blockchain-based OS distribution scheme disclosed herein, a similar mechanism may be used to enable remote control of a client device 102 running the blockchain-based OS. In such embodiments, the client device 102 also searches for nodes 301 that contain commands, as well as OS software. For example, this may comprise starting from the same root node 301R and following paths of edges down to the leaves 301L. If the client device 102 finds OS software validly stored in a leaf node 301, it includes that in the OS software run to be on the client device. If on the other hand it finds a command, it carries out the command. The command could for example be a command of a general-purpose script language recognized by the OS, such as shell script or Python script. In some embodiments a script of multiple such commands could be included in the transaction. As another example the command could be a device- or application-specific command (assuming the OS has the capability to interpret it) such as: read a temperature and publish it on chain, or open a gate, or change the update frequency to X, etc. Similar to files and folders, a scheme of tags (e.g. also stored in the payload) may be used to record whether a node 301 holds software or command (or in some implementations it is not excluded that both could be allowed in the same node).

A command may be included in a leaf node 301L by a remote administrator system that is remote from the client device 102, e.g. at a different geographic site. Both the administrator system and the client device 102 are connected to the blockchain network 106, e.g. via the Internet. The administrator system itself may also be a client of the blockchain network 106, or could even be one of the blockchain nodes 104. The administrator system can record a new transaction on the blockchain 150, e.g. like Alice or Bob in FIG. 1, and make the new transaction a leaf 301L of the tree. In various use cases this may be done at a later stage (e.g. later date) after the client device initially runs the OS from the chain. Commands are higher-level instructions than the executable code (machine code instructions) of the operating system, and they are interpreted by the operating system or higher-level application software run on the client, rather than being executed at the machine code level. The described technique could also extend to a script of multiple commands.

In some embodiments the OS software (or a command) held in a particular node 301 can be updated or deleted by appending another node to that node. This applies in embodiments where only leaf nodes 301L are deemed to contain valid content. To do this, the administrator system appends a new node 301 to the current leaf node 301L that is to be deleted or updated. Append means connect with an overlay network edge 302 in the sense discussed in relation to FIG. 3 or 4, for example. I.e. the new node is made a child 301C of the node to which it is appended, which is now parent 301P of the new node. Thus the old leaf is now an intermediate node 3011, and the new node is a new leaf 301L.

Figure 7:
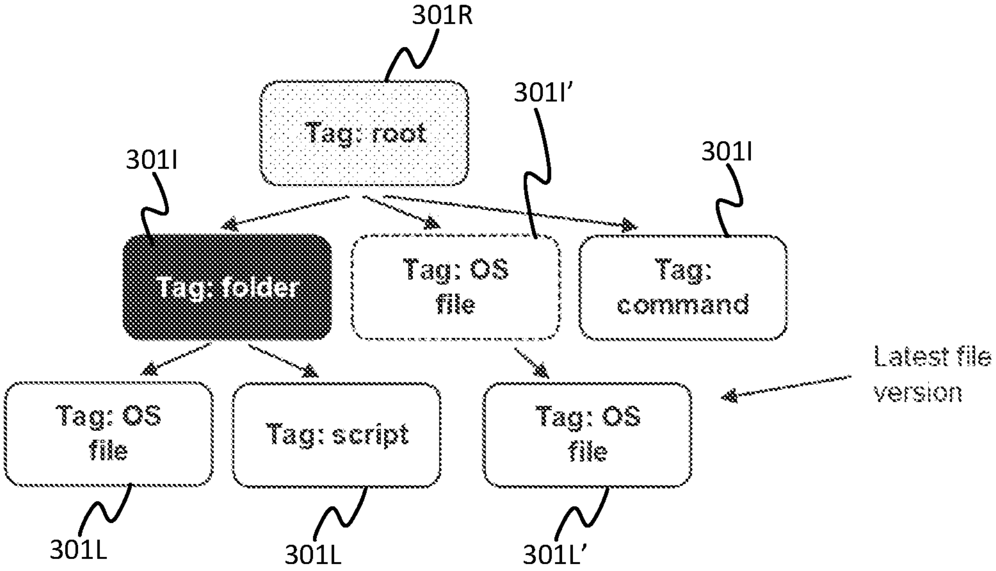
FIG. 7 schematically illustrates a process of updating a file in an overlay network tree structure such as a Metanet tree, wherein the current version is replaced by a new one by creating a link from the old to the new version (the new version being a child of an older version)
Figure 8:
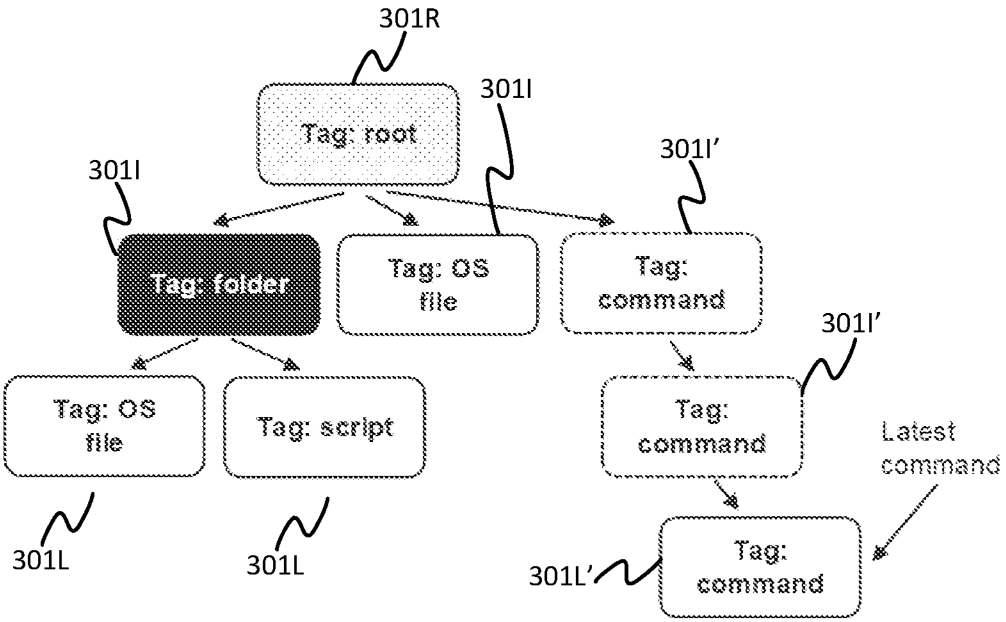
FIG. 8 schematically illustrates an example of carrying out a command or executing some code, wherein commands and code are published on the same tree of the operating system.

FIGS. 7 and 8 shows some examples. The label 3011' represents a node that was previously a leaf but is now an intermediate node, having had a new leaf appended to it. The label 301L' represents a newly appended leaf.

FIG. 9 shows optional steps that may be implemented by a client device 102 to implement updates and/or deletions, and/or to carry our commands from a remote administrator. At step 940, after having started running the OS software initially accessed at steps 910 to 930, the client device 102 continues to monitor the blockchain 150 for new target transactions that contain OS software (and/or in some cases commands). In embodiments this comprises monitoring the current leaf nodes 301L to check whether any new nodes are appended to the (previous) leaves. Alternatively or additionally, the monitoring may comprise re-walking the paths of the tree from its root 301R to the leaves 301L to check for new paths leading to new leaves. At step 950, the client device determines whether the monitoring has found any new target nodes 301. If not it loops back to step 940 where it continues monitoring. If so however, the method proceeds to step 960 where the client device determines whether the new target node contains OS software or a command. If it contains OS software, this is deemed an update, and the method branches to stop 960 where the client device 102 implements the update. If it is a command on the other hand, the method branches to step 970 where the client device 102 carries out the command. Another possibility is that the node contains neither an update to the OS software nor a command. In this case (assuming it is not tagged as a folder node), the newly appended node is deemed to represent a deletion of its parent, and the client 102 stops running the OS software or stops carrying out the command that was included in the deleted parent.

Whatever the nature of the new node, the client device 102 then loops back to step 940 where it continues monitoring for yet further new target nodes.

As another optional feature, the client device 102 may be configured to record an acknowledgement on the blockchain 150 when it has accessed or run a piece of OS software from one of the nodes 301, and/or when it has carried out a command from such a node. This means the client device 301 sends a transaction to the blockchain network 106 to be published on the blockchain 150 (or sending it to the administrator or a third party for the administrator system or third party to forward onward to the blockchain network to be published in the blockchain 150). This transaction includes the acknowledgment in a payload of the transaction, e.g. in an unspendable output (for instance made unspendable with an OP_RETURN or OP_FALSE, OP_RETURN, depending on protocol used). This acknowledgement then remains immutably on-chain as evidence that the client accessed or ran the OS software or carried out the command.

The acknowledgement may be used to certify that the client device has simply received the command or script. Alternatively or additionally, the acknowledgment may be recorded by the client device 102 once it has actually run the OS software or command. In this case the acknowledgement may simply record that the client device 102 has reported to have run the software or command, which provides some evidence though not irrefutable evidence (a device could cheat and say that it executed a command, but it didn't). E.g.: a device could acknowledge that it received a command to open a gate, but it is difficult to prove that it actually opened it. Alternatively, the acknowledgment could employ provable computing techniques to provide stronger evidence that the software or command was run. Existing techniques to prove the execution of code are, in themselves, known in the art. As yet another optional feature, the client device 102 may be connected with one or more other client devices in a network, e.g. a wireless local area network such as a Wi-Fi network, Bluetooth network, ZigBee network, or the like. In embodiments this network may take the form of a mesh network. This may be a network other than the wide-area network 101 used by the client device 102 (and in embodiment administrator system) to connect to the blockchain network. When connected with other client devices in a network such as this, the client device may share some or all of the operating system software and/or commands which it has obtained from the blockchain 150 with one or more of the other client devices. This may be advantageous if one or more of the other devices are not connected to the blockchain network 106, or even if they are, to save the bandwidth of every device in the network having to separately query the blockchain. In a mesh network arrangement, some of the other devices may in turn share the OS software and/or command onward with further of their peers in the network, and so forth. Note that not all the devices have to be connected to the blockchain. One is enough, though more than one increases security. More than one increases security because then different devices can connect to different blockchain nodes 104, so they would detect if a blockchain node is cheating and transmitting a fake version of the blockchain. A single device may also be connected to multiple nodes 104 as well to increase security, but it would be a single point of failure (e.g. an attacker could compromise that device and control all the others).

Some further example details of some possible implementations will now be discussed, but by way of illustration only.

Live OS On-Chain

Live operating systems (Live OSs) are OSs that do not need to be installed on a system before being executed. Live OSs are complete bootable systems which run directly from a storage device (e.g., a USB key) into a computer's memory. If published on-chain, these OSs could be automatically executed once downloaded from the blockchain without need to be installed. As an alternative, the blockchain can be used as main persistent storage and only the required parts are downloaded in the device's memory (i.e., the RAM). This is possible for example with Linux systems, because it loads all their drivers at boot time. A live distribution of a lightweight Linux Operating System requires between 50 and 500 MB of disk space, considering a transaction fee of 0.5 sat/byte (standard minimum BSV transaction fee at time of writing), the cost of publishing an operating system on-chain can be estimated between 0.25 and 2.5 BSV (between 50 and 500 USD at time of writing). A live OS can be published once and reused. For this reason the cost of uploading an operating system on-chain may be considered affordable, especially for businesses.

When an entire live OS execution is not feasible or desirable, all or part of the OS and software can be installed on the system hard drive and it can be maintained and updated using the blockchain. In circumstances where publishing an entire OS on-chain is not feasible, for example for economic or copyright reasons, part or all of the OS can be stored on one or more third-party servers and only the hash of that may be published. When downloaded from one of these servers, the authenticity of the OS can be verified using the hash published on-chain.

In embodiments live OSs are published on-chain using the Metanet protocol to replicate the OS structure. This has several advantages:

- OS and programs certification and integrity management on-chain.
- Facilitate automatic on-chain updates (a device automatically receives the updates when it updates its Metanet tree).
- Facilitate code execution (code can be linked to the device Metanet tree).
- Provable code execution (date and code executed are stored on-chain).
- Secure access to the devices (using PKI).
- Remote control of all the devices (publishing commands on-chain).
- Facilitate data collection and publishing from the devices.

Using Metanet Trees to Store OSs

The Metanet can be used to structure data on-chain, using tree-like structures. As all the leaves of a tree are associated with their tree root, it is always possible to retrieve and download the entire tree starting from its tree root. The association between a leaf and the root can be direct (i.e., there is a direct parent-child link between the root and the leaf) or indirect (i.e., there are intermediate nodes between the root and the leaf). Given the ID of bitcoin transaction that represents a Metanet root according to the Metanet rules, it is easy to trace and download the entire tree and, if the private keys are known, to append new nodes to the tree. Structuring the data using the Metanet protocol is advantageous because it provides an efficient way to link and retrieve data, to validate and invalidate nodes and to update files.

A generic system (e.g. a laptop or an IoT device), can download and execute an operating system stored in a Metanet tree on-chain given its tree root. This means that if the tree root is provided and stored in a secure way, the system will always be able to download and execute the same OS in a verifiable way. Moreover, it will automatically update and execute newly published code when the new information is included in a new Metanet node and linked to the same tree. An IoT device, for example, could be produced with an embedded tree root (e.g., stored in a ROM). This IoT device will be always linked to the same tree, it will always download the correct version of the operating system and the published updates, and it will execute any code (e.g. a smart contract) that is published in that tree (a possible implementation is discussed later). As long as the private keys used to create and manage that tree are not compromised, the IoT device is secure and can execute any arbitrary code in a provable way and using the specified libraries and modules.

As an example, in FIG. 5 is represented a tree structure that is used to store a live distribution of Linux, namely Puppy Linux BionicPup32: given the three root ID, all the files and folders can be downloaded. In the example there are two folders "uui" (Universal USB Installer) and "help". The folder "uui" contains the "syslinux.cfg" file, that is a boot loader for Linux that runs on FAT filesystems. The "help" folder contains some files that show textual messages during the boot loading process. Other files are linked directly to the tree root, as, for example, the "ubuntu_10.03.sfs" file which is a "combo pack" of multiple applications in one file, specific of Puppy distributions. The "*.c32" files store 32-bit modules used by syslinux to runs low-level functions such as detecting and setting up hardware during the boot process. Other files (not represented in the figure) including modules, libraries, drivers, programs and so on are linked, directly or indirectly, to the same tree root.

Publishing an OS On-Chain

An OS can be published on-chain by the software distributor or by any system administrator (if the OS license allows to do so). In the first case a plain OS will be published, in the second case additional software, configuration files and scripts can be published along with the OS. An OS is contained in a "OS root directory", the OS root directory is the first or top-most directory in a hierarchy. It can be likened to the trunk of a tree, as the starting point where all branches containing the different files originate from. Given any live OS distribution contained in an OS root directory, it can be published on-chain following the steps below:

1. Create a Metanet node representing the OS root directory. Additional information (e.g., distribution name and version) can be added here.
2. For each file and folder in the actual OS root directory (i.e. the root of the device or the folder containing the OS), create a new Metanet node representing that file or folder (more details later). Link these nodes (as children) to the OS root node.
3. Select a folder not yet processed, create a new Metanet node for each file and folder included in it. Link these nodes (as children) to the selected folder.
4. Repeat point 3 for each folder and sub-folder.

In this example embodiment, each tree that represents an OS (or better an OS root directory) is required to respect the following rules:

1. All the files and folders must be valid Metanet nodes, a node can contain a special tag to specify if that node contains a file or represents a folder. An example of transaction representing a file or a folder is shown in FIG. 6.
   If a Metanet node contains a file, the file must be stored after the OP_RETURN (possibly encrypted).
   If a Metanet node represents a folder, the name of the folder must be stored after the OP_RETURN (possibly encrypted).
2. All the files and folders that are stored in the OS root directory must be children of the tree root.
3. All the files and folders that are not stored in the root of an operating system (i.e., they are contained in a folder), must be children of a node that represents that folder in the Metanet tree.

Table 1 below shows an example structure of a Metanet node containing a file or a folder. More tags or metadata can be added to the list, after the file or folder name.

TABLE 1

| $TxID_{node}$ | | | |
|---|---|---|---|
| Inputs | | Outputs | |
| Value | Script | Value | Script |
| x BSV | < Sig $P_{parent}$><br>< $P_{parent}$> | 0 BSV | OP_FALSE_OP_RETURN<br><metanet flag><br>< $P_{node}$><br>< $TxID_{parent}$><br><type tag> (root, file, folder)<br><file hash><br><(encrypted)file or folder name><br><additional information> |
| | | x BSV | OP_DUP OP_HASH160<br>< $H_{160}(P_{node})$><br>OP_EQUALVERIFY<br>OP_CHECKSIG |

A simple example of a Metanet tree with four nodes (each node is like the one depicted in FIG. 5), representing one tree root (Tx1), one folder (Tx2) and two files (Tx3, Tx4) is shown in FIG. 6. In the first level (the OS root) there is one file and one folder. The second file is stored inside the folder at level 1, The four nodes would be published on-chain as follows:

Root—Tx1: OP_RETURN META $P_1$ None root

Folder—Tx2: Sig$P_1P_1$|OP_RETURN META $P_2$ Tx1 folder encrypted_folder_name

File1—Tx3: Sig$P_1P_1$|OP_RETURN META $P_3$ Tx1 file encrypted_file1

File2—Tx4: Sig$P_2P_2$|OP_RETURN META $P_4$ Tx2 file encrypted_file2

Where $P_x$ are the public keys (all different) of the respective nodes.

It is possible to publish two types of OS on-chain: generic usage and ad-hoc systems. On one hand, generic usage OSs have basic installation and configuration and can be linked to any compatible device. Ad-hoc systems, on the other hand, are specifically published for a device or a set of devices, they usually have specific configurations and programs installed and are used to control the devices. Multiple copies of the same ad-hoc system can be published and linked with different devices, this enable the control of the behaviour of the different devices (as they are linked to different trees) by publishing different commands in each tree.

Downloading an On-Chain OS

A new device willing to download and install an OS published on-chain may be required to have the requirements here outlined and follow the instructions described hereafter.

It stores (has knowledge of) the transaction ID of the tree root.

It has access to the blockchain, either directly (e.g., ethernet, wi-fi) or indirectly (e.g., ZigBee).

It knows the encryption key (if the data is encrypted).

It has a private key (if the device is required to write data on-chain).

When the device is turned on for the first time, a minimal preinstalled software connects to one or more bitcoin nodes (like a lightweight client would do) and performs the following steps:

1. Download the latest version of the tree, starting from the provided transaction ID (i.e., the tree root). To ensure that the most recent version of data is used, if any two transactions with the same Metanet node public key are available, the one with the highest block height is used.
2. Verify the root.
3. Verify the children signatures. As the presence of the signature of the parent in the unlocking script is not enough to prove the validity of a child, an explicit signature validation process is recommended: for example, for each node the entire transaction creating it (used in the unlocking script) and the transaction that originates it (the one that contains the locking script) have to be provided, along with their Merkle proof).
4. Decrypt data as needed, for each node:
   if the node contains a file, it is decrypted and stored in the system hard drive root or in the specified folder,
   if a node contains a folder, a folder with the same name is created in the specified path.

Finally, the system monitors the blockchain for changes in its tree, if new updates are found they are automatically downloaded (as described in step 1, 2, 3) and installed (step 4).

Updating the OS

Devices using on-chain OSs will preferably perform regular checks on the state of their Metanet tree, looking for updates. This process, which may be referred to as tree discovery, may comprise three steps:

1. The blockchain is parsed, looking for the transaction containing the tree root of the OS and its children.
2. The latest copy of the tree on-chain is compared with the one currently in use locally:
   New nodes are identified: new nodes are nodes with a public key $P_{node}$ that was not present before.
   Outdated nodes are identified: outdated nodes are nodes that have a duplicate node (a node with the same public key $P_{node}$) on-chain. In this case only the latest version is retrieved: the block height of the competing version is compared and the node with the highest height is selected (the most recently published).
3. New nodes and nodes with a newer version available are downloaded, and the modifications or updates are the applied to the system (e.g., an outdated file is replaced with its latest version). The device might need to be rebooted or turned off to complete this step.

OS updates can be published on-chain by software distributors (e.g., Microsoft could publish and maintain a live version of Windows) or by system administrators. System administrators can also publish updates relative to configurations and specific software (e.g., update a Python module). When a distributor or a system administrator wants to provide a new version of an operating system, a program, a driver or similar, he/she can publish the new files in new Metanet nodes and link them to the OS tree. The new version of the files can be appended to the tree, as child of the previous version of the same file.

During the tree discovery process, the system will automatically detect nodes with new children attached, the relative files will be replaced with the latest (deepest in the tree) version available. This technique allows the automatic update of any software without using any third-party server (thus reducing the maintenance cost and removing many security and availability concerns), but simply publishing the latest version on-chain, associated with the respective OS tree. Devices associated with this tree will be automatically updated during the tree discovery process.

As an example, in FIG. 7, a file in a Metanet tree is updated: the latest version of a file is always a child of the previous version of the same file and uses the same public key $P_{node}$. The version considered valid is always the leaf node, that is the deepest node of that specific branch. Similarly, a node can be deleted (i.e., removed from a Metanet tree) by creating a new sibling or child node with the same $P_{node}$ and empty content. Alternatively or additionally, a node can be deleted by spending the UTXO present in transaction containing the node.

Publishing Commands and Code On-Chain

A Metanet tree can be used not only to store an operating system, but also to publish commands or any code/script (e.g. smart contracts) that should be executed by the device(s) associated with that tree. Like OS files and software, these commands, code and scripts, are published as Metanet nodes, linked (directly or indirectly) to the tree root and categorized using a special tag.

Using this technique, the owner of the operating system tree (e.g., the system administrator) can control the device(s), publishing new code, scripts or commands to be executed on one or more specific devices. Publishing the code on-chain, allows one to prove the exact code that has been sent to the device and the specific time it was published on-chain, the code can be encrypted and the decrypting key could be available only to the involved parties for increased privacy. Additionally, the device can publish an acknowledgement on-chain to prove when the code has been received and executed.

An example of a Metanet tree with some command nodes is shown in FIG. 8. Commands and code may be published on the same tree of the operating system In embodiments, the exact sequence of commands is stored as a proof on the blockchain.

Commands and code can be updated by publishing a new version on-chain, like for the OS and software update. During the tree discovery process, these nodes are processed and their content is executed, replacing the older version. The update process is the same discussed earlier, where a new command or code is downloaded and an already existing command or code is replaced when a newer version is available (a node same public key but higher block height). In this scenario, the tree functions not only as a repository but also as a logger: it is in fact always possible to establish which commands or code have been sent to a device, in which order and at which specific time (and also the execution status and time if an acknowledgement message is used).

Once the OS is up and running, the commands and code execution is performed as follows:

1. Nodes that contain commands or code/scripts are downloaded and processed: the operations required such as, run some files or read some sensors are executed.
2. Output data (e.g., measurements, alerts, computation results) can be written on the blockchain, publishing transactions signed with the device private key.

Scripts can be executed once (e.g., open a gate), or they can be tasks (e.g., read the temperature and publish it on-chain) that are repeated until a new command/script is received.

Finally, the system monitors the blockchain for changes in its tree using the tree discovery process, if new commands or code are found, they automatically replace the respective older versions.

Example Applications

The following describes two possible applications of Metanet-based OSs, one for deterministic execution of smart contracts and the other for remote control of IoT devices.

Deterministic Execution of Smart Contacts

Smart contracts should provide a deterministic result, so that their execution can be replicated and verified by other blockchain nodes. A transaction containing a smart contract could, therefore, include also a Metanet root node linking the Metanet-based OS to be used and add, as a requirement, that the smart contract is executed only in an environment running the OS and software provided. A node willing to publish that transaction should download the relative OS and execute the code provided. Other nodes or entities that wants to verify a given smart contract, must download the same OS and execute the smart contract inside that machine. Alternatively, a smart contract could also be part of the tree (i.e., it is node containing code in the same tree). However, for computational reasons, verifying a smart contract should not be a requirement for all the nodes (contrary the verification of published transactions), but only an optional check.

It is worth mentioning that with the expression "smart contract" we here refer to the execution of code that could be proven and recorded using blockchain techniques instead of the entire process of distributed execution and verification on-chain (like Ethereum smart contracts).

An example of Metanet transaction containing a smart contract linked to an OS is shown in Table 2 below, with the smart contract and the reference to the OS stored after the OP_RETURN and the other parameters.

TABLE 2

| $TxID_{node}$ | | | |
|---|---|---|---|
| Inputs | | Outputs | |
| Value | Script | Value | Script |
| x BSV | < Sig $P_{parent}$><br>< $P_{parent}$> | 0 BSV | OP_FALSE OP_RETURN<br><metanet flag><br>< $P_{node}$><br>< $TxID_{parent}$><br><type tag> smart contract<br><OS ref> tx id of OS root node<br><smart contract code> code |
| | | x BSV | OP_DUP OP_HASH160<br>< $H_{160}(P_{node})$><br>OP_EQUALVERIFY<br>OP_CHECKSIG |

Full nodes can provide lists of OSs and software that they already support, and they may charge users for executing code. In such a way users can adapt their code to be executed on OSs already widely available at low cost in the bitcoin ecosystem, or they may pay an extra fee to a node to execute code on specific OSs or using specific software by providing a new OS tree root.

Benefits of this approach comprise:

Standard, certified, and verifiable environments.

Deterministic and provable code execution.

Creation of a market where nodes can sell computational power.

IoT Devices Controlled On-Chain

Companies that want to run or sell Internet of Things (IoT) devices with provable code execution functionalities, could replace preinstalled IoT OSs with an on-chain OS. An IoT device using a Metanet-based OS only needs the ability to connect to one or more blockchain nodes and the reference to the specific OS on-chain (the root node). A private key is also required if the IoT device should publish data on-chain (e.g., measurements or computation results). The latest version of the OS is then downloaded from the blockchain (as explained in the previous chapter). Devices not directly connected to the internet, could communicate with other IoT devices and receive updates from the bitcoin nodes using a wireless mesh network protocol (e.g. ZigBee).

The devices can be upgraded and controlled remotely just appending nodes to the OS tree. Having IoT devices controlled on-chain guarantees system integrity, decentralized management, and logging of all the actions (e.g., commands) sent to the device. All without the need to configure and maintain third-party servers.

Conclusion

It will be appreciated that the above embodiments have been described by way of example only.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In embodiments, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

More generally still, there may be provided a method, apparatus or program in accordance with any one or more of the following Statements.

Statement 1: a method comprising, by a client device: identifying one or more target transactions, recorded on a blockchain, that contain operating system software stored in a payload of the one or more target transactions, the operating system software comprising at least part of an operating system, at least including some executable code of the operating system; accessing the operating system software from the payload of the one or more target transactions as stored on the blockchain; and running, on the client device, the operating system software as accessed from the one or more target transactions, said running comprising executing the executable code of the operating system.

Statement 2: the method of Statement 1, wherein said operating system software is the whole of the operating system.

Statement 3: the method of Statement 1 or 2, wherein said running comprises running said operating system software live from the blockchain by streaming it via RAM of the client device without installing on the client device.

Statement 4: the method of Statement 1 or 2, wherein said running comprises installing a copy of the operating system software on the client device and running the installed copy.

Statement 5: the method of any preceding Statement, wherein the accessing and running of said operating system software are performed upon booting the client device.

Statement 6: the method of any preceding Statement, further comprising, by the client device: sending to be published on the blockchain an acknowledgement that the client device has accessed the operating system software.

Statement 7: the method of any preceding Statement, further comprising, by the client device: sending to be published on the blockchain an acknowledgement that the client device has run the operating system software.

Statement 8: the method of any preceding Statement, wherein said one or more target transactions are a plurality of target transactions.

Statement 9: the method of any preceding Statement, wherein a tree structure is overlaid on the blockchain, the tree structure comprising a plurality of nodes and edges between nodes, wherein each node is a different transaction recorded on the blockchain, and each edge connects from a respective child node to a respective parent node, the edges being formed by each child node specifying a transaction ID of its respective parent node in a payload of the respective child node, and wherein one of the parent nodes is a root node of the tree structure; and wherein the one or more target transactions storing said operating system software are child nodes of said tree structure.

Statement 10: the method of Statement 9, wherein the tree structure comprises a Metanet tree.

Statement 11: the method of Statement 9 or 10, wherein said operating system software comprise a plurality of files in different folders arranged in a hierarchical file-and-folder structure, wherein each of the target transactions stores at least a respective one of the files and one or more parent nodes of the target transactions are tagged so as to represent folders, such that at least part of the tree structure of the nodes follows at least part of the file-and-folder structure of the operating system software.

Statement 12: the method of any of Statements 9 to 11, wherein said identifying comprises, based on the transaction ID of the root node, following paths of the edges from the root node down the tree structure to find leaf nodes, the leaf nodes being child nodes that are not parent nodes of other child nodes, wherein each of the one or more target transactions is a leaf node.

Statement 13: the method of Statement 12, wherein the client device checks that each of the target transactions, and any intermediate parent node on a path between a target transaction and the root node, meets one or more rules of a tree protocol associated with the tree structure; wherein said execution is conditional on the meeting of said one or more rules.

Statement 14: the method of Statement 13, wherein the set of rules comprises at least: for each child along a path from root node to target transaction, the child is signed by key of the respective parent node.

Statement 15: the method of Statement 13 or 14, wherein the one or more rules comprise: that only leaf nodes can form a valid part of the operating system.

Statement 16: the method of any of Statement 15, further comprising, by the client device: at a subsequent time following said execution, checking for any new leaf node that has been subsequently appended to a respective one of the target transactions, such that the respective target transaction is no longer a leaf; wherein the new leaf nodes represent updates or deletion of the respective target transaction.

Statement 17: the method of Statement 16, wherein one of the respective target transactions comprises an update, the method further comprises the client device running the update.

Statement 18: the method of any preceding Statement, further comprising, by the client device: identifying a further transaction on the blockchain, containing a remote command or script recorded in a payload of the further transaction by a remote administrator system remote from the client device; and carrying out the command or script as accessed from the further transaction.

Statement 19: the method of Statement 18, further comprising, by the client device: sending to be published on the blockchain an acknowledgement that the client device has accessed the command or script.

Statement 20: the method of Statement 18 or 19, further comprising, by the client device: sending to be published on the blockchain an acknowledgement that the client device has carried out the command or script.

Statement 21: the method of any preceding Statement, wherein the device is an Internet-of-things, IoT, device.

Statement 22: the method of any preceding Statement, wherein the client device is connected with one or more other devices in a network, and shares the operating system software with at least one of the other devices via said network.

Statement 23: the method of Statement 22, wherein the network is a mesh network.

Statement 24: the method of Statement 22 or 23, wherein the network is a wireless local area network.

Statement 25: the method of Statement 22, 23 or 24, wherein not all of the other devices have access to the blockchain.

Statement 26: the method of any preceding Statement, wherein the blockchain employs an output-based model, each transaction comprises at least one respective input and a respective one or more outputs, and wherein the payload of each transaction is contained in one or more of the respective outputs.

Statement 27: a client device comprising: processing apparatus comprising one or more processing units, and memory comprising one or more memory units; wherein the memory stores code arranged to run on the processing apparatus, the code being configured so as when run on the processing apparatus to perform operations in accordance with any preceding Statement.

Statement 28: a computer program embodied on computer-readable storage, the computer program comprising code configured so as when run on a client device to perform operations in accordance with any of Statements 1 to 26.

Statement 29: a method comprising, by computer equipment of a producer of an operating system: transmitting operating system software to be published in a payload of a transaction on a blockchain, the operating system software comprising at least part of the operating system, at least including some executable code of the operating system.

Statement 30: a method of updating a tree structure overlaid on the blockchain, the tree structure comprising a plurality of nodes and edges between nodes, wherein each node is a different transaction recorded on the blockchain, and each edge connects from a respective child node to a respective parent node, the edges being formed by each child node specifying a transaction ID of its respective parent node in a payload of the respective child node, and wherein the tree structure comprises one of the parent nodes as a root node of the tree structure, and a plurality leaf nodes being child nodes that are not parent nodes of other child nodes; wherein one or more of the leaf nodes store operating system software in a payload of the one or more leaf nodes, the operating system software comprising at least part of the operating system, at least including some executable code of the operating system; and wherein the tree structure is governed by a protocol whereby only leaf nodes are deemed to form valid parts of the operating system; the method comprising, by an administrator system: appending a new leaf node to a respective one of the one or more leaf nodes, such that the respective target transaction is no longer a leaf, wherein the new leaf node represents an update or deletion of the respective target transaction.

Statement 31: an administrator system comprising: processing apparatus comprising one or more processing units, and memory comprising one or more memory units; wherein the memory stores code arranged to run on the processing apparatus, the code being configured so as when run on the processing apparatus to perform the method of Statement 30.

Statement 32: a computer program embodied on computer-readable storage, the computer program comprising code configured so as when run on an administrator system, to perform the method of Statement 30.

Other variants or applications of the disclosed technology may become apparent to a person skilled in the art once given the disclosure herein. The scope of the present disclosure is not limited by the above-described embodiments but only by the appended claims.

The invention claimed is:

1. A method comprising, by a client device:

identifying one or more target transactions, recorded on a blockchain, that contain operating system software stored in a payload of the one or more target transactions, the operating system software comprising at least part of an operating system, at least including some executable code of the operating system, wherein a copy of the blockchain is maintained at each of a plurality of blockchain nodes in a blockchain network, and wherein the client device is not one of the blockchain nodes;

by interacting with the blockchain network, accessing the operating system software from the payload of the one or more target transactions as stored on the blockchain; and running, on the client device, the operating system software as accessed in said accessing from the payload of the one or more target transactions, said running comprising executing the executable code of the operating system;

wherein a tree structure is overlaid on the blockchain, the tree structure comprising a plurality of nodes and edges between nodes, wherein each node is a different transaction recorded on the blockchain, and each edge connects from a respective child node to a respective parent node, the edges being formed by each child node specifying a transaction ID of its respective parent node in a payload of the respective child node, and wherein one of the parent nodes is a root node of the tree structure; and wherein the one or more target transactions storing said operating system software are child nodes of said tree structure.

2. The method of claim 1, wherein said running comprises running said operating system software live from the blockchain by streaming it via random access memory of the client device without installing on the client device.

3. The method of claim 1, wherein the accessing and running of said operating system software are performed upon booting the client device.

4. The method of claim 1, further comprising, by the client device: sending to be published on the blockchain an acknowledgement that the client device has accessed the operating system software.

5. The method of claim 1, further comprising, by the client device: sending to be published on the blockchain an acknowledgement that the client device has run the operating system software.

6. The method of claim 1, wherein the tree structure comprises a Metanet tree.

7. The method of claim 1, wherein said operating system software comprise a plurality of files in different folders arranged in a hierarchical file-and-folder structure, wherein each of the target transactions stores at least a respective one of the files and one or more parent nodes of the target transactions are tagged so as to represent folders, such that at least part of the tree structure of the nodes follows at least part of the file-and-folder structure of the operating system software.

8. The method of claim 1, wherein said identifying comprises, based on the transaction ID of the root node, following paths of the edges from the root node down the tree structure to find leaf nodes, the leaf nodes being child nodes that are not parent nodes of other child nodes, wherein each of the one or more target transactions is a leaf node.

9. The method of claim 8, wherein the client device checks that each of the target transactions, and any intermediate parent node on a path between a target transaction and the root node, meets one or more rules of a tree protocol associated with the tree structure; wherein said execution is conditional on the meeting of said one or more rules.

10. The method of claim 9, wherein the one or more rules comprises at least: for each child along a path from root node to target transaction, the child is signed by key of the respective parent node.

11. The method of claim 9, wherein the one or more rules comprise: that only leaf nodes can form a valid part of the operating system.

12. The method of claim 11, further comprising, by the client device: at a subsequent time following said execution, checking for any new leaf node that has been subsequently appended to a respective one of the target transactions, such that the respective target transaction is no longer a leaf; wherein the new leaf nodes represent updates or deletion of the respective target transaction.

13. The method of claim 12, wherein one of the respective target transactions comprises an update, the method further comprises the client device running the update.

14. The method of claim 1, further comprising, by the client device:

identifying a further transaction on the blockchain, containing a remote command or script recorded in a payload of the further transaction by a remote administrator system remote from the client device; and carrying out the command or script as accessed from the further transaction.

15. The method of claim 14, further comprising, by the client device, sending to be published on the blockchain one or both of:

an acknowledgement that the client device has accessed the command or script, or an acknowledgement that the client device has carried out the command or script.

16. The method of claim 1, wherein the client device is connected with one or more other devices in a network, and shares the operating system software with at least one of the other devices via said network.

17. The method of claim 16, wherein the network is a mesh network.

18. The method of claim 16, wherein not all of the one or more other devices have access to the blockchain.

19. A client device comprising:

processing apparatus comprising one or more processing units, and memory comprising one or more memory units;

wherein the memory stores code arranged to run on the processing apparatus, the code being configured so as when run on the processing apparatus, the processing apparatus performs a method comprising:

identifying one or more target transactions, recorded on a blockchain, that contain operating system software stored in a payload of the one or more target transactions, the operating system software comprising at least part of an operating system, at least including some executable code of the operating system, wherein a copy of the blockchain is maintained at each of a plurality of blockchain nodes in a blockchain network, and wherein the client device is not one of the blockchain nodes;

by interacting with the blockchain network, accessing the operating system software from the payload of the one or more target transactions as stored on the blockchain; and running, on the client device, the operating system software as accessed in said accessing from the payload of the one or more target transactions stored on the blockchain, said running comprising executing the executable code of the operating system;

wherein a tree structure is overlaid on the blockchain, the tree structure comprising a plurality of nodes and edges between nodes, wherein each node is a different transaction recorded on the blockchain, and each edge connects from a respective child node to a respective parent node, the edges being formed by each child node specifying a transaction ID of its respective parent node in a payload of the respective child node, and wherein one of the parent nodes is a root node of the tree structure; and wherein the one or more target transactions storing said operating system software are child nodes of said tree structure.

20. A computer program embodied on non-transitory computer-readable storage media, the computer program comprising code configured so as when run on a client device, the client device performs a method comprising:

identifying one or more target transactions, recorded on a blockchain, that contain operating system software stored in a payload of the one or more target transactions, the operating system software comprising at least part of an operating system, at least including some executable code of the operating system;

by interacting with the blockchain, accessing the operating system software from the payload of the one or more target transactions as stored on the blockchain; and running, on the client device, the operating system software as accessed in said accessing from the payload of the one or more target transactions stored on the blockchain, said running comprising executing the executable code of the operating system;

wherein a tree structure is overlaid on the blockchain, the tree structure comprising a plurality of nodes and edges between nodes, wherein each node is a different transaction recorded on the blockchain, and each edge connects from a respective child node to a respective parent node, the edges being formed by each child node specifying a transaction ID of its respective parent node in a payload of the respective child node, and wherein one of the parent nodes is a root node of the tree structure; and wherein the one or more target transactions storing said operating system software are child nodes of said tree structure.

* * * * *